United States Patent
Beall et al.

(10) Patent No.: US 11,698,015 B2
(45) Date of Patent: Jul. 11, 2023

(54) CERAMIC HONEYCOMB BODIES AND METHOD FOR CANNING THEREOF

(71) Applicant: Corning Incorporated, Corning, NY (US)

(72) Inventors: Douglas Munroe Beall, Painted Post, NY (US); Kenneth Richard Miller, Addison, NY (US)

(73) Assignee: Corning Incorporated, Corning, NY (US)

( * ) Notice: Subject to any disclaimer, the term of this patent is extended or adjusted under 35 U.S.C. 154(b) by 377 days.

(21) Appl. No.: 16/645,260

(22) PCT Filed: Oct. 2, 2018

(86) PCT No.: PCT/US2018/053905
§ 371 (c)(1),
(2) Date: Mar. 6, 2020

(87) PCT Pub. No.: WO2019/070663
PCT Pub. Date: Apr. 11, 2019

(65) Prior Publication Data
US 2020/0230587 A1      Jul. 23, 2020

Related U.S. Application Data (60) Provisional application No. 62/566,872, filed on Oct. 2, 2017.

(51) Int. Cl.
*F01N 3/28* (2006.01)
*B01D 46/24* (2006.01)

(52) U.S. Cl.
CPC ......... *F01N 3/2828* (2013.01); *B01D 46/247* (2013.01); *B01D 46/2422* (2013.01);
(Continued)

(58) Field of Classification Search
CPC .............. B01D 46/2429; B01D 46/247; B01D 46/2474; B01D 46/2484; B01D 46/2486;
(Continued)

(56) References Cited

U.S. PATENT DOCUMENTS

| | | |
|---|---|---|
| 3,853,485 A | 12/1974 | Hogan |
| 4,740,408 A | 4/1988 | Mochida et al. |

(Continued)

FOREIGN PATENT DOCUMENTS

| | | |
|---|---|---|
| EP | 0191982 A1 | 8/1986 |
| EP | 3034148 A1 | 6/2016 |

(Continued)

OTHER PUBLICATIONS

Invitation To Pay Additional Fees of the International Searching Authority PCT/US2018/053905; dated Dec. 17, 2018; 10 Pages; European Patent Office.

(Continued)

*Primary Examiner* — Jonathan R Matthias
(74) *Attorney, Agent, or Firm* — Joseph M. Homa (57) ABSTRACT

Ceramic honeycomb bodies and methods for canning the bodies are disclosed herein. The honeycomb bodies comprise a porous ceramic honeycomb structure. The honeycomb structure comprises a network of cells defined by walls that extend in an axial direction about a longitudinal axis from an inlet end to an outlet end of the honeycomb structure. The honeycomb structure also comprises a portion of cells with protrusions. The portion of cells with protrusions supports a greater concentration of catalyst, as compared to a portion of cells without protrusions. The portion of cells with protrusions is disposed off-center with respect to the longitudinal axis of the honeycomb structure such that (Continued)

the portion of cells with protrusions (and greater concentration of catalyst) corresponds to areas of high exhaust flow through the structure.

23 Claims, 10 Drawing Sheets

(52) U.S. Cl.
CPC ..... *B01D 46/2455* (2013.01); *B01D 46/2474* (2013.01); *B01D 46/2482* (2021.08); *B01D 46/2484* (2021.08); *B01D 46/2486* (2021.08); *F01N 2330/30* (2013.01); *F01N 2330/34* (2013.01); *F01N 2330/38* (2013.01); *F01N 2450/02* (2013.01)

(58) Field of Classification Search
CPC   B01D 46/249; F01N 2330/34; F01N 2330/38
See application file for complete search history.

(56) References Cited

U.S. PATENT DOCUMENTS

| | | | |
|---|---|---|---|
| 4,767,309 | A | 8/1988 | Mizuno et al. |
| 7,384,442 | B2 | 6/2008 | Bardhan et al. |
| 7,488,412 | B2 | 2/2009 | Abe et al. |
| 7,834,442 | B2 | 11/2010 | Furman et al. |
| 9,156,742 | B2 | 10/2015 | Hayashi et al. |
| 9,540,977 | B2 | 1/2017 | Sadaoka et al. |
| 9,586,195 | B2 | 3/2017 | Hayashi et al. |
| 2004/0071931 | A1* | 4/2004 | Kai .................... F01N 3/0222 428/116 |
| 2007/0238256 | A1 | 10/2007 | Fischer et al. |
| 2015/0005153 | A1 | 1/2015 | Hayashi et al. |
| 2015/0275726 | A1 | 10/2015 | Tamai et al. |
| 2016/0160720 | A1* | 6/2016 | Sadaoka ............ B01D 46/2474 55/523 |
| 2017/0065919 | A1* | 3/2017 | Yamanishi ......... B01D 46/2476 |
| 2017/0159521 | A1* | 6/2017 | Kobayashi ......... B01D 46/2482 |
| 2017/0165610 | A1* | 6/2017 | Kim ..................... B01D 46/247 |
| 2017/0204759 | A1* | 7/2017 | Matsuya ............. B01D 46/2451 |
| 2017/0266908 | A1 | 9/2017 | Kawakami et al. |
| 2018/0243672 | A1* | 8/2018 | Banju .................. B01D 29/112 |
| 2019/0024551 | A1* | 1/2019 | Suzuki ..................... F01N 3/28 |

FOREIGN PATENT DOCUMENTS

| | | |
|---|---|---|
| JP | 62266298 A | 11/1987 |
| WO | 2006/093649 A2 | 9/2006 |

OTHER PUBLICATIONS

International Search Report and Written Opinion of the International Searching Authority; PCT/US2018/053905; dated Feb. 20, 2019; 18 Pages; European Patent Office.

* cited by examiner

FIG. 11

CERAMIC HONEYCOMB BODIES AND METHOD FOR CANNING THEREOF

CROSS-REFERENCE TO RELATED APPLICATIONS

This application is a National Stage application under 35 U.S.C. § 371 of International Application No. PCT/US2018/053905 filed on Oct. 2, 2018 which claims the benefit of priority under 35 U.S.C. § 119 of U.S. Provisional Application Ser. No. 62/566,872, filed on Oct. 2, 2017, the contents of which are relied upon and incorporated herein by reference in their entireties.

FIELD

The following description relates generally to ceramic honeycomb bodies for use in an engine exhaust treatment applications, and to methods of canning ceramic honeycomb bodies.

BACKGROUND

Ceramic honeycomb bodies are used in the motor vehicle industry in engine exhaust treatment applications such as filter and catalytic converter applications. The catalyst material supported by the honeycomb body facilitates the reduction of pollutants as engine exhaust flows through the honeycomb body. The catalyst material may include costly metals, such as platinum and palladium.

SUMMARY

Illustrative embodiments of the present disclosure are directed to a honeycomb body. The honeycomb body comprises a porous ceramic honeycomb structure comprised of: a network of cells defined by walls that extend in an axial direction about a longitudinal axis from an inlet end to an outlet end of the porous ceramic honeycomb structure; and a plurality of protrusions that (i) protrude from the walls and into respective cells and (ii) extend from the inlet end to the outlet end of the porous ceramic honeycomb structure. The porous ceramic honeycomb structure comprises a first portion of cells comprising a first protrusion concentration, a second portion of cells comprising a second protrusion concentration, and the first protrusion concentration is greater than the second protrusion concentration. The first portion of cells has a geometric center which is offset from the longitudinal axis as viewed in a transverse plane perpendicular to the longitudinal axis.

In some embodiments, the first portion of cells comprises protrusions of different heights.

In some embodiments, at least one cell in the first portion of cells comprises protrusion walls of different heights within the at least one cell.

In some embodiments, the honeycomb body comprises an outermost peripheral wall. The network of cells comprises peripheral cells defined at least in part by at least a portion of the outermost peripheral wall.

In some embodiments, a plurality of the peripheral cells comprise protrusions.

In some embodiments, a catalyst material is disposed in or on the walls of the porous ceramic honeycomb structure and a greater concentration of the catalyst material is present in or on the first portion of cells as compared to a concentration of catalyst material in or on the second portion of cells.

In some embodiments, the first protrusion concentration is greater than the second protrusion concentration in number of protrusions per unit area of the porous ceramic honeycomb structure and the unit area of the porous ceramic honeycomb structure is viewed in a transverse plane perpendicular to the longitudinal axis.

In some embodiments, the first protrusion concentration is greater than the second protrusion concentration in surface area of protrusions per unit volume of the porous ceramic honeycomb structure.

In some embodiments, the second portion of cells lacks protrusions.

In some embodiments, the first portion of cells comprises a contiguous collection of cells with an area of at least 20% of the porous ceramic honeycomb structure as viewed in a transverse plane perpendicular to the longitudinal axis.

In some embodiments, the second portion of cells comprises a contiguous collection of cells with an area of at least 20% of the porous ceramic honeycomb structure as viewed in a transverse plane perpendicular to the longitudinal axis.

In some embodiments, each protrusion of the plurality of protrusions does not extend between two different cells walls.

In some embodiments, a periphery of the first portion of cells defines a shape as viewed in a transverse plane perpendicular to the longitudinal axis and the shape is symmetric about at least one axis of the shape.

In some embodiments, a periphery of the first portion of cells defines a shape as viewed in a transverse plane perpendicular to the longitudinal axis and the shape is asymmetric about at least one axis of the shape.

In some embodiments, the honeycomb body comprises at least one of (i) cordierite, (ii) aluminum titanate, or (iii) silicon carbide.

In some embodiments, the walls and the plurality of protrusions comprises the same material composition.

Illustrative embodiments of the present disclosure are directed a honeycomb body. The honeycomb body comprises a porous ceramic honeycomb structure comprised of: a network of cells defined by walls that extend in an axial direction about a longitudinal axis from an inlet end to an outlet end of the porous ceramic honeycomb structure. The porous ceramic honeycomb structure comprises a first portion of cells comprising a first cell density, a second portion of cells comprising a second cell density, and the first cell density is greater than the second cell density. The first portion of cells has a geometric center which is offset from the longitudinal axis as viewed in a transverse plane perpendicular to the longitudinal axis. The first portion of cells and the second portion of cells comprises the same material properties.

In some embodiments, catalyst material is disposed in or on the walls of the porous ceramic honeycomb structure. A greater concentration of the catalyst material is present in the first portion of cells as compared to a concentration of catalyst material in or on the second portion of cells.

In some embodiments, the first portion of cells comprises a contiguous collection of cells with an area of at least 20% of the porous ceramic honeycomb structure as viewed in a transverse plane perpendicular to the longitudinal axis.

In some embodiments, the second portion of cells comprises a contiguous collection of cells with an area of at least 20% of the porous ceramic honeycomb structure as viewed in a transverse plane perpendicular to the longitudinal axis.

In some embodiments, a periphery of the first portion of cells defines a shape as viewed in the transverse plane perpendicular to the longitudinal axis and the shape is symmetric about at least one axis of the shape.

In some embodiments, a periphery of the first portion of cells defines a shape as viewed in the transverse plane perpendicular to the longitudinal axis and the shape is asymmetric about at least one axis of the shape.

In some embodiments, the honeycomb body comprises at least one of (i) cordierite, (ii) aluminum titanate, or (iii) silicon carbide.

Illustrative embodiments of the present disclosure are further directed to a method of canning a honeycomb body comprising a longitudinal axis. The method comprises circumferentially aligning the honeycomb body about the longitudinal axis within a can; and securing the honeycomb body within the can to preserve the aligning.

In some embodiments, circumferentially aligning the honeycomb body within the can comprises rotating the honeycomb body about the longitudinal axis.

In some embodiments, the first portion of the honeycomb body comprises a first catalyst concentration, the second portion of the honeycomb body comprises a second catalyst concentration, and the first catalyst concentration is greater than the second catalyst concentration.

In some embodiments, circumferentially aligning the honeycomb body within the can comprises aligning the honeycomb body within the can such that fluid flow through a first portion of the honeycomb body is greater than fluid flow through a second portion of the honeycomb body.

In some embodiments, the first portion of the honeycomb body is off-center with respect to a longitudinal axis of the honeycomb body.

In some embodiments, the first portion of the honeycomb body comprises a plurality of protrusions that (i) protrude from the walls and into cells and (ii) extend from an inlet end to an outlet end of the honeycomb body.

In some embodiments, the first portion of the honeycomb body comprises a first cell density, the second portion of the honeycomb body comprises a second cell density, and the first cell density is greater than the second cell density.

In some embodiments, the method further comprises determining a fluid flow velocity profile for the can and circumferentially aligning the honeycomb body within the can comprises circumferentially aligning the honeycomb body within the can using the fluid flow velocity profile.

In some embodiments, the can comprises a curved inlet that produces an asymmetric fluid flow velocity profile within the can.

BRIEF DESCRIPTION OF THE DRAWINGS

The above and other features, aspects and advantages of the present disclosure are better understood when the following detailed description of the disclosure is read with reference to the accompanying drawings, in which.

DETAILED DESCRIPTION

Illustrative embodiments of the present disclosure are directed to a honeycomb body with a porous ceramic honeycomb structure. The honeycomb structure comprises a network of cells defined by walls that extend in an axial direction about a longitudinal axis from an inlet end to an outlet end of the honeycomb structure. The honeycomb structure also comprises a portion of cells with protrusions. The protrusions protrude from the walls and into cells. The portion of cells with protrusions supports a greater concentration of catalyst, as compared to a portion of cells without protrusions or with a lesser concentration of protrusions. The portion of cells with protrusions is preferably disposed off-center with respect to the longitudinal axis of the honeycomb structure such that the portion of cells with protrusions (and greater concentration of catalyst) corresponds to areas of high exhaust flow through the structure. In this manner, the honeycomb body can provide for efficient use of the catalyst material. Details of various embodiments are discussed below.

Figure 1:
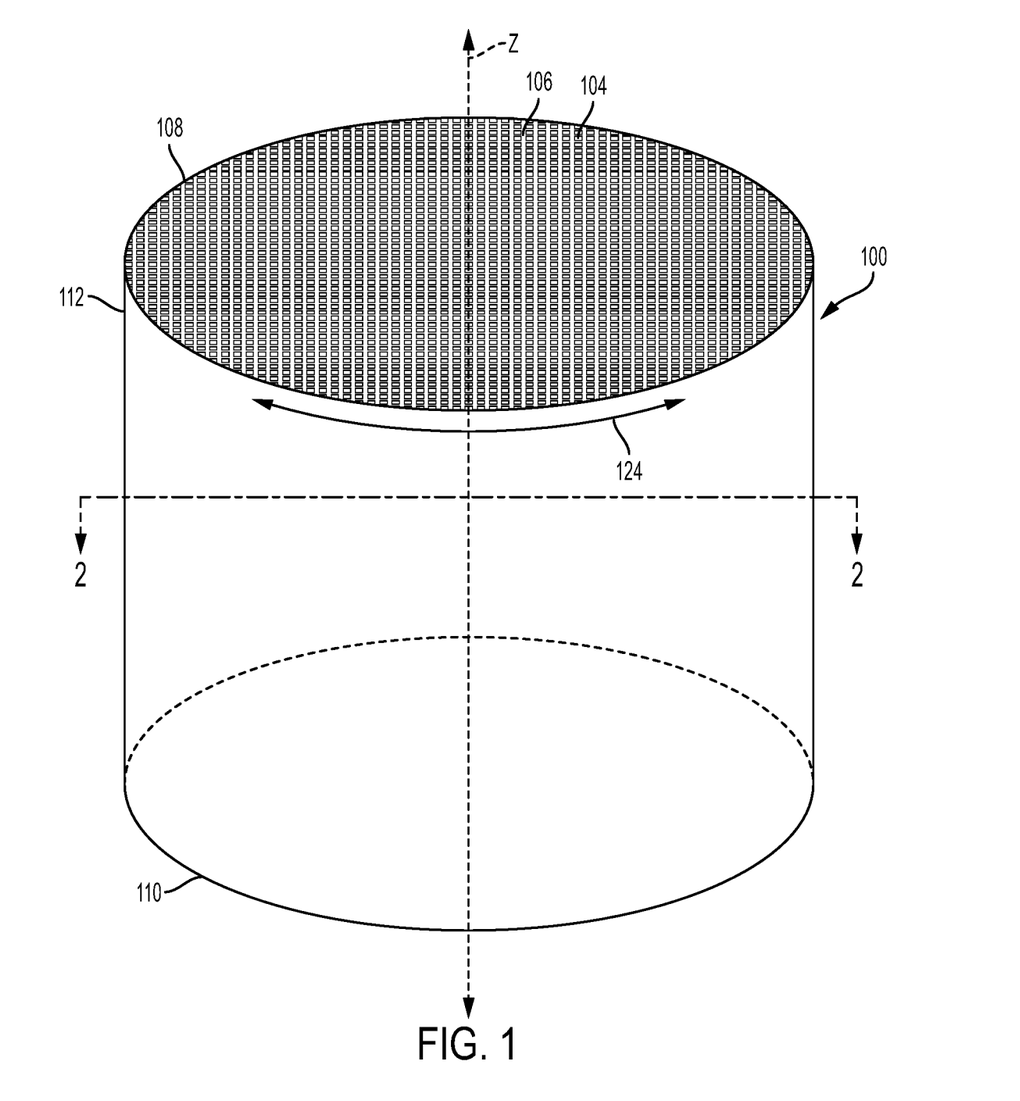
FIG. 1 is a perspective view showing a honeycomb body in accordance with one embodiment of the present disclosure.

FIG. 1 is a perspective view showing a honeycomb body 100 with a porous ceramic honeycomb structure 102. The porous ceramic honeycomb structure 102 comprises a network of cells 104 defined by walls 106 that extend in an axial direction about a central longitudinal axis (z-axis) from an inlet end 108 to an outlet end 110 of the porous ceramic honeycomb structure. The honeycomb body 100 also comprises an outermost peripheral wall 112 that extends between the inlet end 108 and an outlet end 110. The honeycomb structure 102 comprises a number of peripheral cells 105 that are at least partially defined by the outermost peripheral wall 112.

Figure 2:
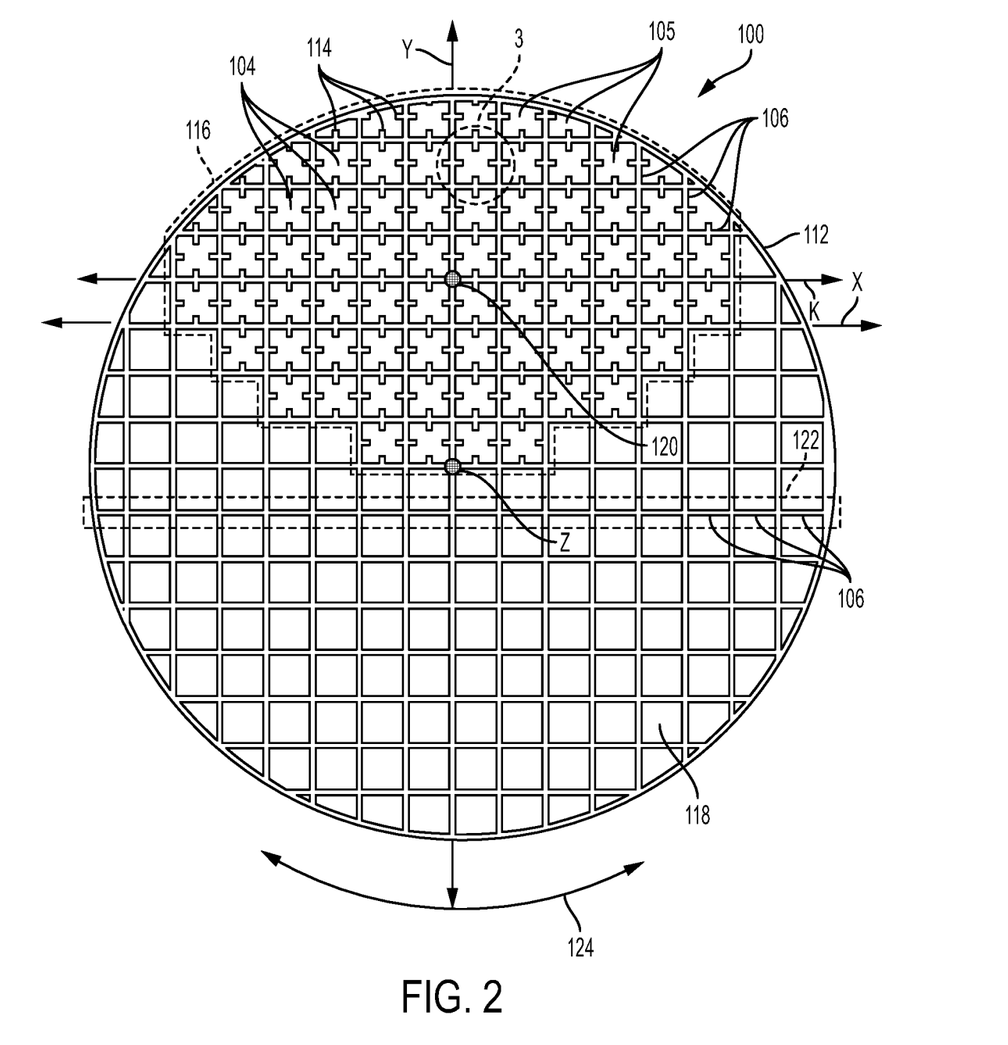
FIG. 2 is a schematic sectional view showing the honeycomb body along line 2-2 of FIG. 1.

FIG. 2 is a schematic sectional view showing the honeycomb body 100 and structure 102 along line 2-2 of FIG. 1. The honeycomb structure 102 comprises a plurality of protrusions 114 that protrude from walls 106 and into cells 104. The protrusions 114 preferably extend from the inlet end 108 to the outlet end 110 of the honeycomb structure 102 (e.g. forming rectangular fin-shaped structures). The protrusions 114 provide an increased geometric surface area of each cell that contains one or more protrusions 114 and therefore provide a greater capacity to support catalyst. The honeycomb structure 102 comprises a first portion of cells 116 with a first protrusion concentration and a second portion of cells 118 with a second protrusion concentration.

The first portion of cells 116 has a protrusion concentration that is greater than the second protrusion concentration. In FIG. 2, the first portion of cells 116 is a contiguous collection of cells that is defined by a broken line. In some embodiments, the first portion of cells 116 is a contiguous collection of cells with an area that is at least 20% of the honeycomb structure as viewed in a transverse plane perpendicular to the longitudinal axis (z-axis) (e.g., at least 30%, at least 40%, at least 50%, at least 60%, at least 70%, or at least 80% of the honeycomb structure). The contiguous collection of cells comprises the cells with the greatest protrusion concentrations. This contiguous collection of cells contains a corresponding area of the honeycomb structure with the greatest protrusion concentration. Also, the first portion of cells 116 has a geometric center 120 which is offset from the central longitudinal axis (z-axis) as viewed in a transverse plane perpendicular to the longitudinal axis. The geometric center of the first portion of cells 116 is the average position of all the points within the first portion of cells.

The second portion of cells 118 comprises the remainder of the cells within the honeycomb structure 102. In various embodiments, the second portion of cells 118 is a contiguous collection of cells with an area that is at least 20% of the honeycomb structure as viewed in the transverse plane perpendicular to the longitudinal axis (z-axis) (e.g., at least 30%, at least 40%, at least 50%, at least 60%, or at least 70% of the honeycomb structure).

Figure 3:
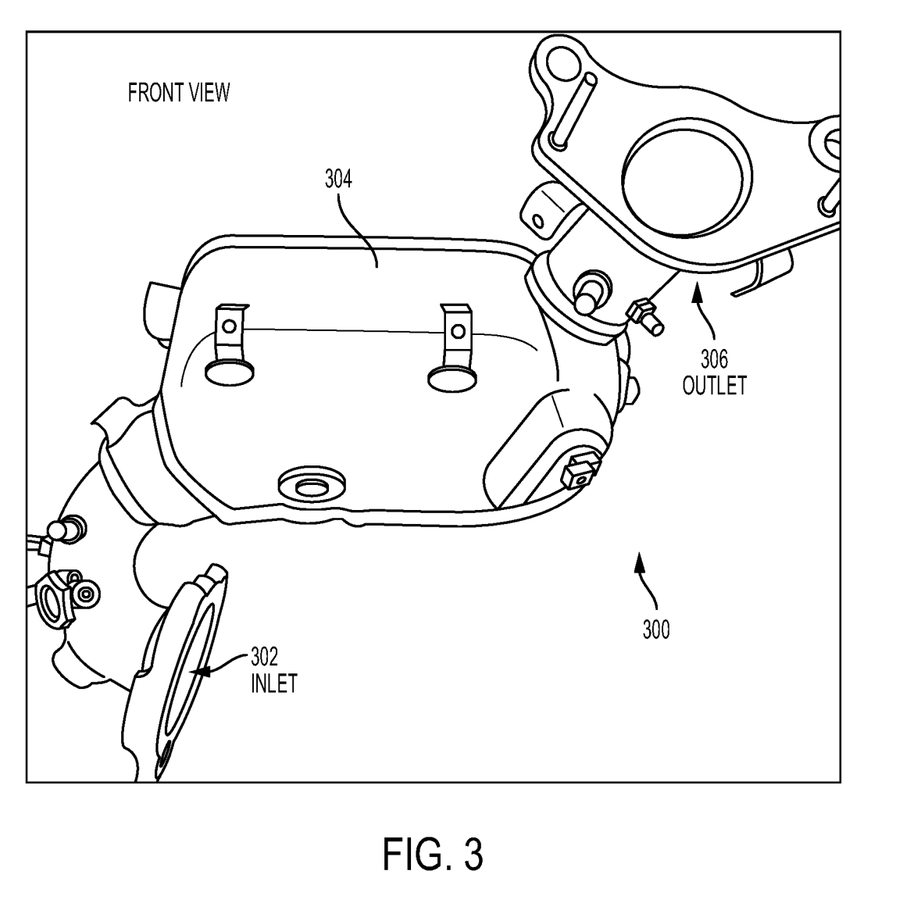
FIG. 3 shows a catalytic converter can including inlet and outlet pipes.

In operation, the honeycomb body 100 is disposed within a catalytic converter can. FIG. 3 shows an example of a catalytic converter can 300. The can is made from a metal, such as stainless steel. The can 300 comprises an exhaust inlet 302, a can body 304, and an exhaust outlet 306. The honeycomb body 100 is positioned inside the can body 304 so that engine exhaust flows into the inlet 302, through the honeycomb body 100, and out through the outlet 306. As the exhaust flows through the honeycomb body 100, the exhaust interacts with catalyst material in or on the honeycomb body 100 and the catalyst material facilitates the reduction of pollutants (e.g., oxides of nitrogen and carbon monoxide) within the engine exhaust. The catalyst material may comprise expensive metals, such as platinum and palladium. The catalyst material is disposed in or on the walls and the protrusions of the honeycomb structure.

Figure 4:
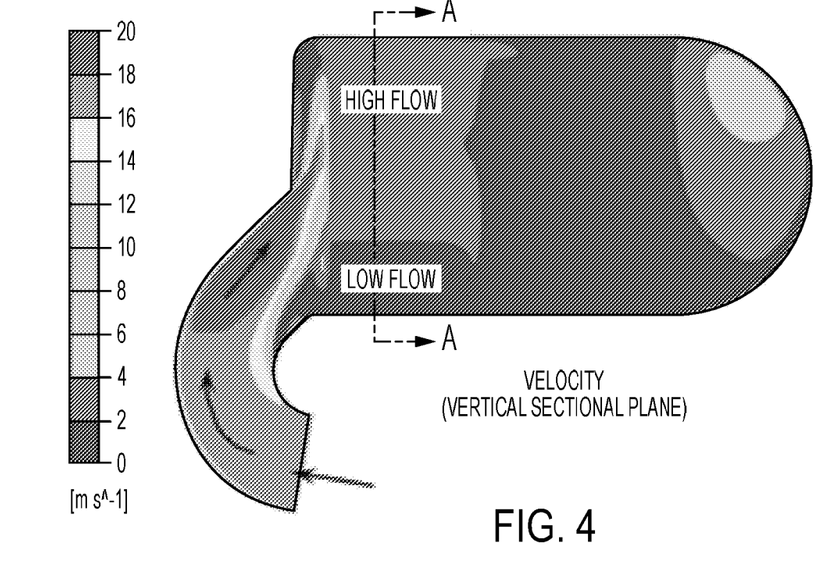
FIG. 4 shows a flow velocity profile with respect to a section plane for the catalytic converter can of FIG. 3.
Figure 5:
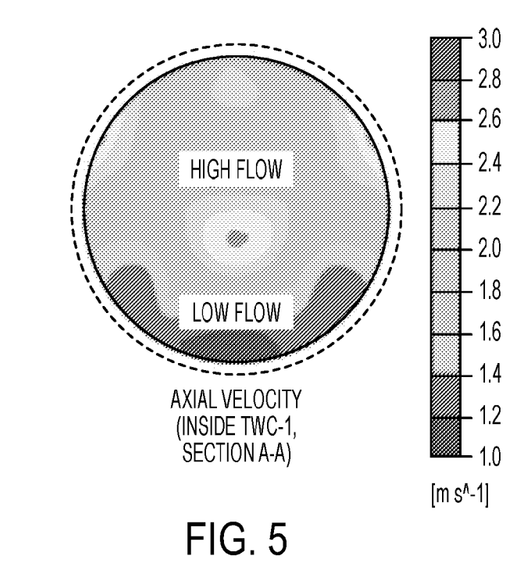
FIG. 5 shows a flow velocity profile along line A-A of FIG. 4.

The flow of engine exhaust through the catalytic converter can 300 (and the honeycomb body 100 within the can) may have an asymmetric profile which may find application in many exhaust configurations. FIG. 4 shows a flow velocity profile with respect to a section plane for the catalytic converter can 300 of FIG. 3, while FIG. 5 shows the flow velocity profile along line A-A of FIG. 4. FIGS. 4 and 5 show that the curved inlet 302 produced an asymmetric fluid flow velocity profile with areas of high fluid flow located along upper portions (e.g., 1.6-2.4 m/s) and central portions (e.g., 2.4-3.0 m/s) of the can body 304, and areas of low fluid flow located along lower portions (e.g., 1.0-1.6 m/s) of the body.

Figure 6A:
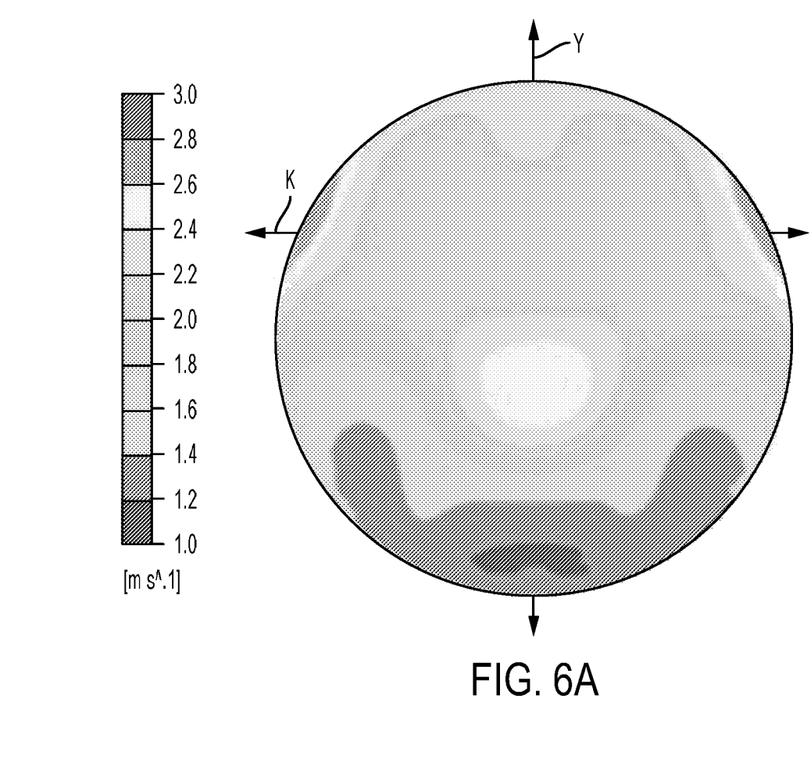
FIG. 6A shows a flow velocity profile and FIG. 6B shows a corresponding schematic sectional view of a honeycomb body, in accordance with one embodiment of the present disclosure.
Figure 6B:
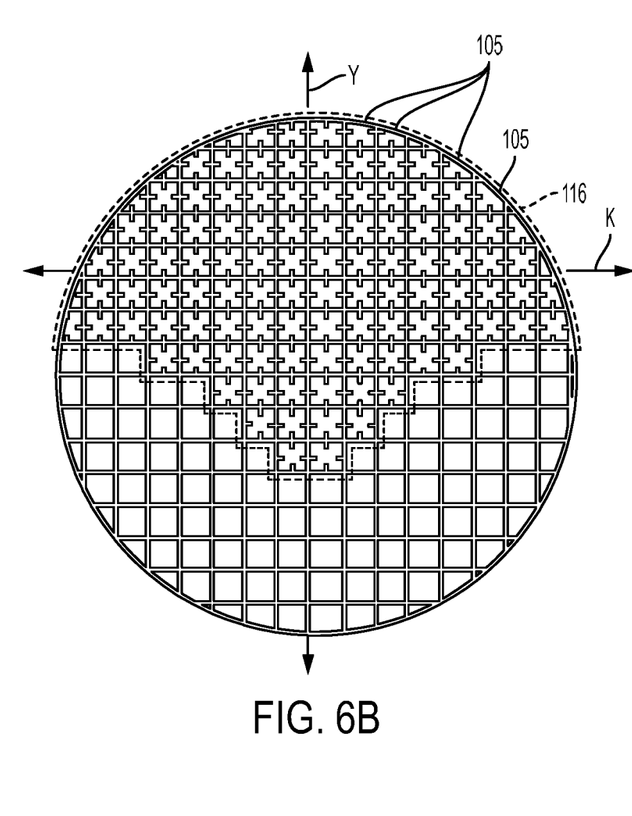

Embodiments of the honeycomb body 100 disclosed herein can more efficiently use catalyst when a portion of cells with protrusions corresponds to areas of high flow within catalytic converter can. For example, FIG. 6A shows a flow velocity profile and FIG. 6B shows a corresponding schematic sectional view of a honeycomb body 600 having an off-center portion of cells 616 with protrusions. The off-center portion of cells 616 with protrusions corresponds to areas of high flow through the can (e.g., 1.6 m/s-3.0 m/s), while the portion of cells without protrusions correspond to areas of lower flow (e.g., 1.0 m/s-1.6 m/s). Thus, the honeycomb body 600 uses a greater concentration of expensive catalyst in areas of high flow where the catalysts will have a greater effect in reducing pollutants, while also reducing use of catalyst in low flow areas where the catalyst will have less potential to reduce pollutants. In this manner, the honeycomb body 600 can reduce costs associated with applying expensive catalyst, while also using the catalyst as effectively or more effectively to reduce pollutants.

In some embodiments, an off-center portion of cells with protrusions can be used to increase geometric surface area of particular cells and increase resistance to fluid flow so that fluid flow is forced into other cells of the honeycomb body that would otherwise be less utilized (e.g., a conical fluid flow profile can be "flattened out.")

In some embodiments, an off-center portion of cells with protrusions can provide for a greater catalyst loading within the honeycomb body, which is beneficial when the honeycomb body is installed near an engine's exhaust manifold. Such "close coupled" applications typically require high catalyst loading.

In some embodiments, the protrusions 104 allow for use of a honeycomb body with constant cell density, while creating different catalyst concentrations within the honeycomb body. With a constant cell density, the webs of the honeycomb body 100 can extend across the honeycomb body 100 without interruption resulting in a honeycomb body with good structural integrity and constant mechanical properties (e.g., elastic modulus). A single web is called out by reference numeral 122 in FIG. 2. The web 122 comprises a plurality of cell wall sections 106 extending across a transverse plane perpendicular to the longitudinal axis (z-axis). In contrast, honeycomb bodies that use different cell densities to alter catalyst concentration have interfaces between areas of different cell densities that negatively impact structural integrity and impart large step changes in elastic modulus at the interfaces.

In some embodiments, honeycomb bodies with constant cell densities do not require interfaces or partial cells between areas of different cell densities and therefore do not have any of the associated problems (e.g., clogging with washcoat, isostatic strength issues, and thermal shock issues).

In some embodiments, an off-center portion of cells with protrusions can be formed with an extrusion die that is made using existing machining methods, such as wire electrical discharge machining (wEDM) and/or plunge/conventional EDM.

The first portion of cells 116 can have a number of different shapes to better match the areas of high flow through the honeycomb body 100. This shape is defined by the periphery of the first portion of cells 116 as viewed in a transverse plane perpendicular to the longitudinal axis (z-axis). For example, in FIGS. 2 and 6B, the shapes are defined by broken lines. In some embodiments, the shape of first portion of cells 116 is at least partially defined by the outermost peripheral wall 112 of the honeycomb structure 112. In FIG. 6B, the shape extends to comprise peripheral cells 605 because those cells are located in areas of high flow, as shown in FIG. 6A. Furthermore, in some embodiments, the shape of the first portion of cells 116 is symmetric about at least one axis of the shape. For example, in FIG. 6B, the shape of the first portion of cells 616 is symmetric about the y-axis to match an area of high flow through the honeycomb body, which is also symmetric about the y-axis, as shown in FIG. 6A. In some embodiments, the shape is asymmetric about at least one axis of the shape. For example, in FIG. 6B, the shape of the first portion of cells 616 is asymmetric about an axis referred to as the k-axis. The shape of the first portion of cells 616 is asymmetric about the k-axis to match an area of high flow through the honeycomb body, which is also asymmetric about the k-axis, as shown in FIG. 6B.

Figure 7:
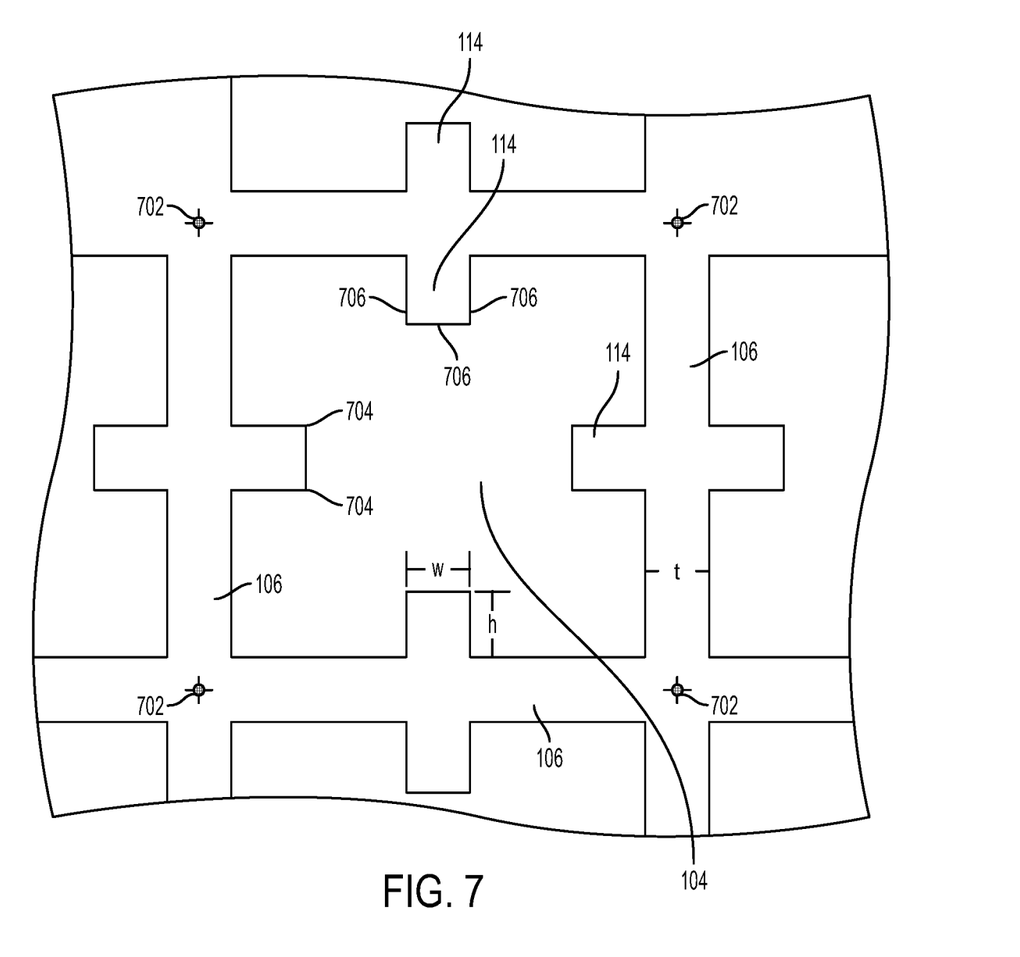
FIG. 7 is an enlarged view showing the honeycomb body taken at view 3 of FIG. 2.

FIG. 7 is an enlarged view showing the honeycomb body 100 taken at view 3 of FIG. 2, which shows the protrusions 114 in greater detail. The protrusions 114 protrude from the walls 106 and into respective cells 104. However, the protrusions 114 do not extend all the way across the cell 104 between two different walls 106. For example, a protrusion 114 does not extend between opposing walls 106 in a cell. In FIG. 7, the protrusions 114 extend from points that are located between vertices 702 of the cell 104. In some embodiments, the protrusions 114 are centered between the vertices (e.g., extend from a center point between the vertices). However, in other embodiments, the protrusions 114 may be located between the vertices 702 but off-center with respect to the center point between the vertices. In such embodiments, extrusion of the protrusions is facilitated because ceramic batch material is more easily fed to the protrusion from a feedhole in an extrusion die. In further embodiments, the protrusions 104 can extend from the vertices 702 of the cell 104 and into the cell. Protrusions that extend from the vertices 702 protrude into the cell and therefore are different from fillets or chamfers, which merely smooth or bevel interior corners between cell walls.

In some embodiments, the height (h) of the protrusions 114 is equal to or greater than the width (w) of the protrusions. The height (h) of the protrusion is the distance from the wall 106 of the cell to the farthest extending point of the protrusion into the cell 104, as shown in FIG. 7. The width (w) of the protrusion is the greatest dimension that is orthogonal to the height (h), as shown in FIG. 7. For example, the height of the protrusions 114 can be at least two times the width of the protrusions or at least three times the width of the protrusions. In FIG. 7, each protrusion 114 within the cell 104 has the same height. In other embodiments, such as the one shown in FIG. 8, the protrusions 114 can have different heights. For example, protrusions 802 across from each other within the cell 104 can have a height that is greater than the height of protrusions 804 on adjacent walls. Furthermore, different cells can have protrusions 114 with different heights. For example, the first portion of cells 116 can form a gradient in geometric surface area where protrusion height in cells at the center of the first portion is greater than protrusion height in cells at the periphery of the portion. FIG. 9 shows a schematic sectional view of a honeycomb body 900 that comprises a gradient in protrusion heights. The honeycomb body 900 comprises a first portion of cells 902 where the protrusion height is greatest at the geometric center 904 of the first portion and decreases towards the peripheral areas 906 of the first portion. A gradient in protrusion heights creates a gradient in geometric surface area, which can be used to further enhance catalyst utilization by better matching geometric surface area to fluid flow. The gradient in geometric surface area can also be achieved by varying the number of protrusions in each cell.

Figure 8:
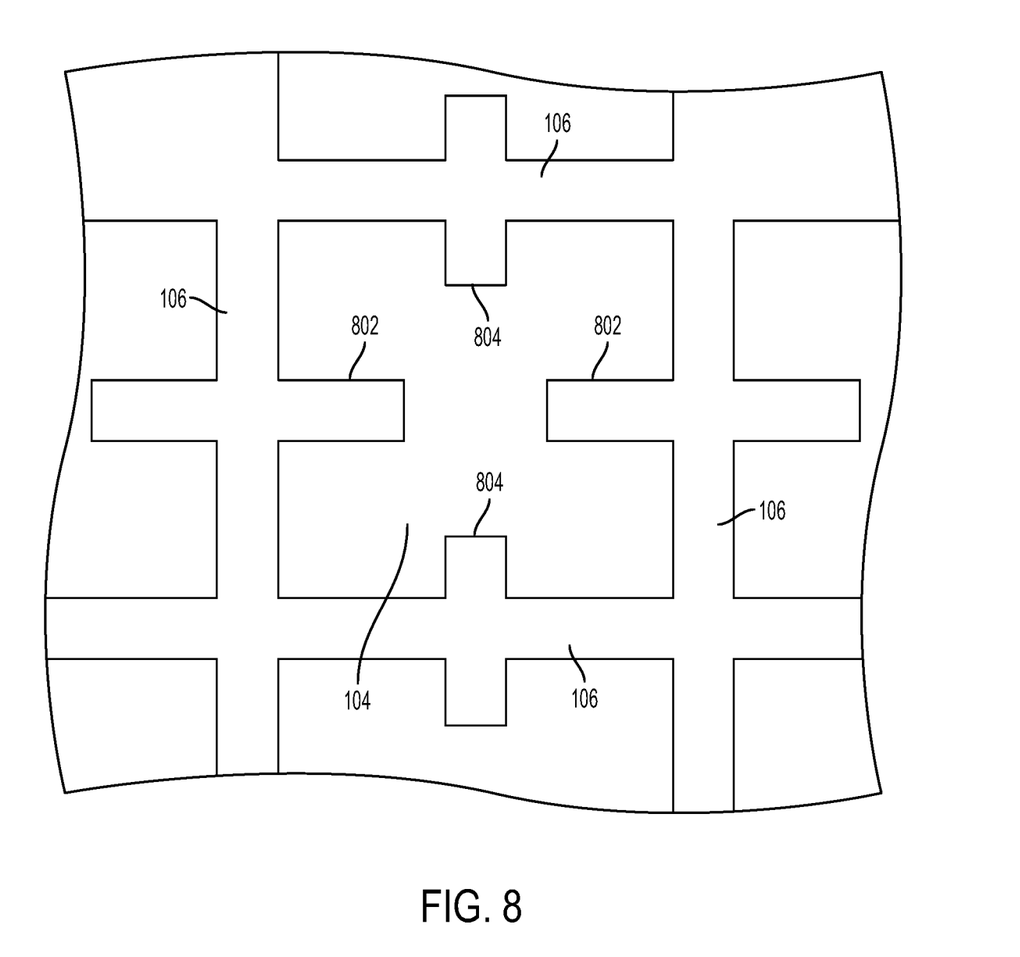
FIG. 8 is an enlarged view similar to FIG. 7, but showing an alternative example honeycomb body configuration in accordance with one embodiment of the of the present disclosure.
Figure 9:
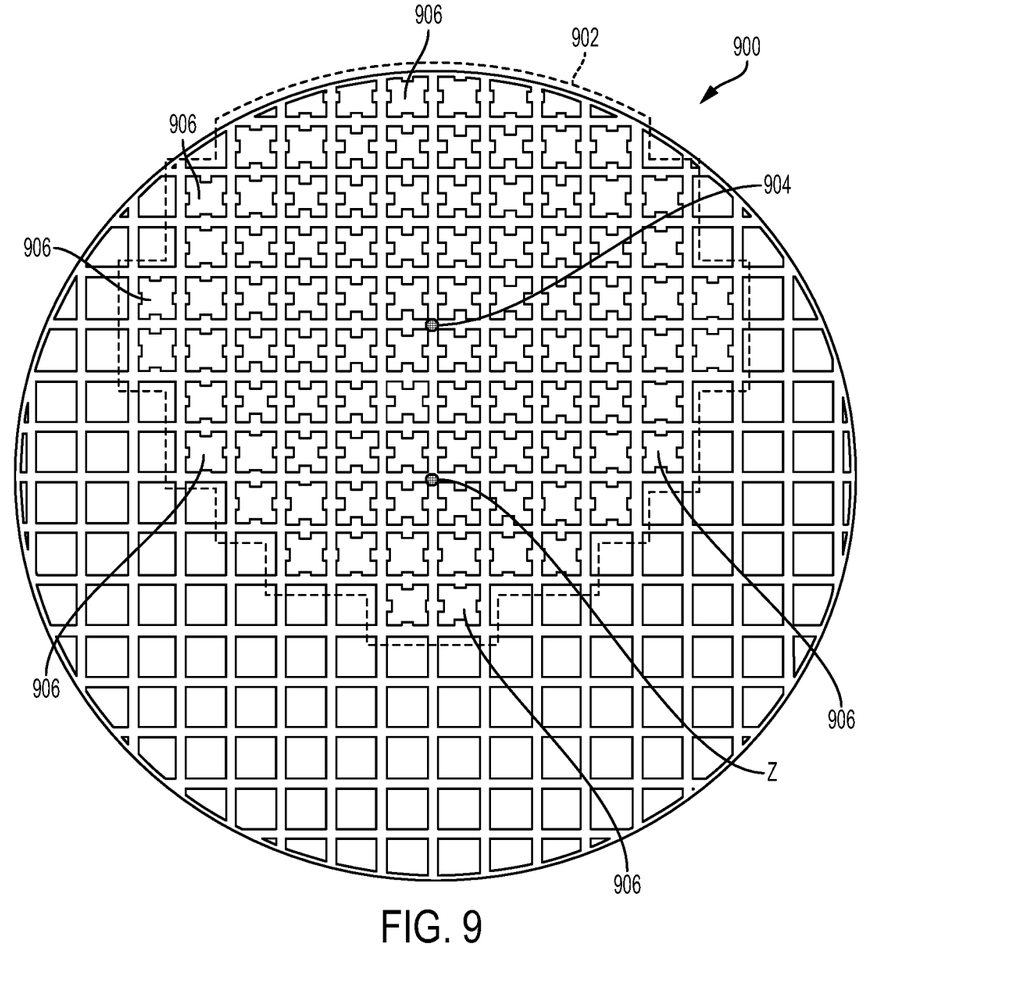
FIG. 9 shows a schematic sectional view of a honeycomb body that comprises a gradient in protrusion heights in accordance with one embodiment of the present disclosure.

The cells 114 shown in FIGS. 7 and 8 comprise one protrusion 114 that extends from each wall 106 of the cell. In other embodiments, multiple protrusions 114 can extend from each wall of the cell (e.g., 2, 3, or 4 protrusions). In some embodiments, as shown in FIGS. 7 and 8, the protrusions 114 are square or rectangular with 90° corners 704.

As explained above, the protrusion concentration in the first portion of cells 116 has a greater concentration of protrusions than the second portion of cells 118. In one embodiment, the protrusion concentration in the first portion of cells 116 has a greater concentration of protrusions than the second portion of cells 118 in terms of number of protrusions per unit area of the ceramic honeycomb structure, when the unit area of the ceramic honeycomb structure is viewed in a transverse plane perpendicular to the longitudinal axis (z-axis). In another embodiment, the protrusion concentration in the first portion of cells 116 has a greater concentration of protrusions than the second portion of cells 118 in terms of number of protrusions per cell of the ceramic honeycomb structure. For example, in FIG. 2, the first portion of cells 116 has a protrusion concentration of approximately 4 protrusions per cell, whereas the second portion of cells 118 completely lacks protrusions. In yet another embodiment, the protrusion concentration in the first portion of cells 116 has a greater concentration of protrusions than the second portion of cells 118 in terms of surface area of protrusions per unit volume of the porous ceramic honeycomb structure. The surface area of the protrusions can be determined by summing the surfaces areas of each surface of the protrusion, such as surfaces 706 as shown in FIG. 7. The volume of the porous ceramic honeycomb structure can be determined by summing the volumes of the protrusions and cell walls.

In various embodiments, the honeycomb body is comprised of a porous ceramic material, such as (i) cordierite, (ii) aluminum titanate, (iii) silicon carbide, or (iv) combinations thereof. In some embodiments, the ceramic material is a composite material, such as a cordierite and aluminum titanate composite material. In various embodiments, the porous ceramic body is predominantly composed of cordierite (e.g., greater than 50%, 60%, 70%, 80%, or 90% by weight of the porous honeycomb body is a cordierite phase).

In some embodiments, the protrusions and the walls of the honeycomb structure are made from the same material properties (e.g., porosity, pore size, and composition). Further, in various embodiments, the ceramic honeycomb bodies described herein are manufactured by extruding a precursor ceramic material to form a green honeycomb structure, which is then dried and fired to form a ceramic porous honeycomb structure. In various embodiments, the protrusions and the walls of the honeycomb structure are extruded together.

Furthermore, the honeycomb body 100 described herein is not limited to any particular type of geometry or shape. As shown in FIGS. 1 and 2, the honeycomb body 100 has a circular shape as viewed in a transverse plane perpendicular to the longitudinal axis of the honeycomb structure (z-axis), but the honeycomb body can also have other shapes, such as elliptical or polygonal (e.g., triangular or square) shapes. Furthermore, the cells 104 can also have various different shapes, such as circular, elliptical, or polygonal (e.g., triangular, square, rectangular, hexagonal, and octagonal) shapes. Also, the honeycomb body 100 can have a variety of cell densities so that a larger or smaller number of cells 104 can be provided per unit area as viewed in a transverse plane perpendicular to the longitudinal axis of the honeycomb body. For instance, the channel density can be in the range of from about 7.75 channels/cm$^2$ (50 channels/in$^2$) to about 232.5 channels/cm$^2$ (1500 channels/in$^2$) of the honeycomb body. In various embodiments, the thickness of the walls 106 ("t" as shown in FIG. 7) can range between about 2 mil to 25 mil depending on a selected cell density.

Figure 10:
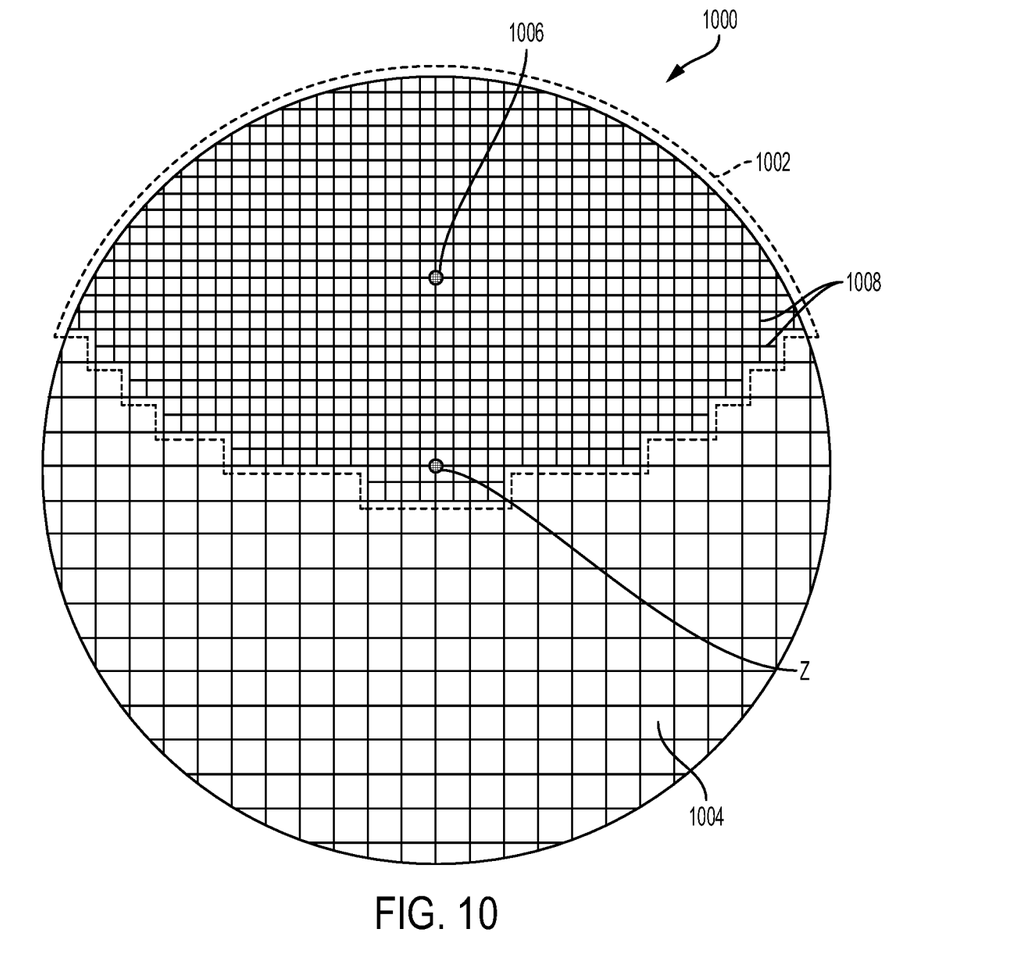
FIG. 10 shows a sectional view of a honeycomb body that includes a first portion of cells with a first cell density and a second portion of cells with a second cell density in accordance with one embodiment of the present disclosure.

The honeycomb bodies shown in FIGS. 2, 6B, and 9 comprise constant cell densities. However, in other embodiments, the honeycomb bodies may have areas with different cell densities. For example, FIG. 10 shows a sectional view of a honeycomb body 1000 that comprises a first portion of cells 1002 with a first cell density and a second portion of cells 1004 with a second cell density. The first cell density is greater than the second cell density so that the first portion of cells 1002 has a greater surface area and thus supports a greater concentration of catalyst, as compared to the second portion of cells 1004. The first portion of cells has a geometric center 1006 which is offset from the longitudinal axis as viewed in a transverse plane perpendicular to the longitudinal axis (z-axis). Thus, like the off-center portion of cells with protrusions, a honeycomb body that comprises an off-center portion of cells with a greater cell density can more efficiently use catalyst when the off-center portion of cells corresponds to areas of high flow within a catalytic converter can.

In FIG. 10, the first portion of cells 1002 has a cell density that is four times greater than the cell density in the second portion of cells 1004. The additional cells in the first portion 1002 are created by adding additional cell wells 1008 to the network of walls. Other cell densities can also be used. For example, the first portion of cell 1002 may have a cell density that is at least 1.5, 2, 3, or 4 times the cell density of the second portion of cells 1004.

In various embodiments, the first portion of cells 1016 with the smaller cell density is a contiguous collection of cells with an area that is at least 20% of the honeycomb structure as viewed in a transverse plane perpendicular to the longitudinal axis (e.g., at least 30%, at least 40%, at least 50%, or at least 60%, or at least 70% of the honeycomb structure). Also, the first portion of cells 1016 and the second portion of cells 1018 have the same material properties. In particular, the first portion of cells 1016 and the second portion of cells 1018 may have the same porosity and pore diameter (e.g., average pore diameter). Also, the first portion of cells 1016 and the second portion of cells 1018 may comprise the same composition.

Figure 11:
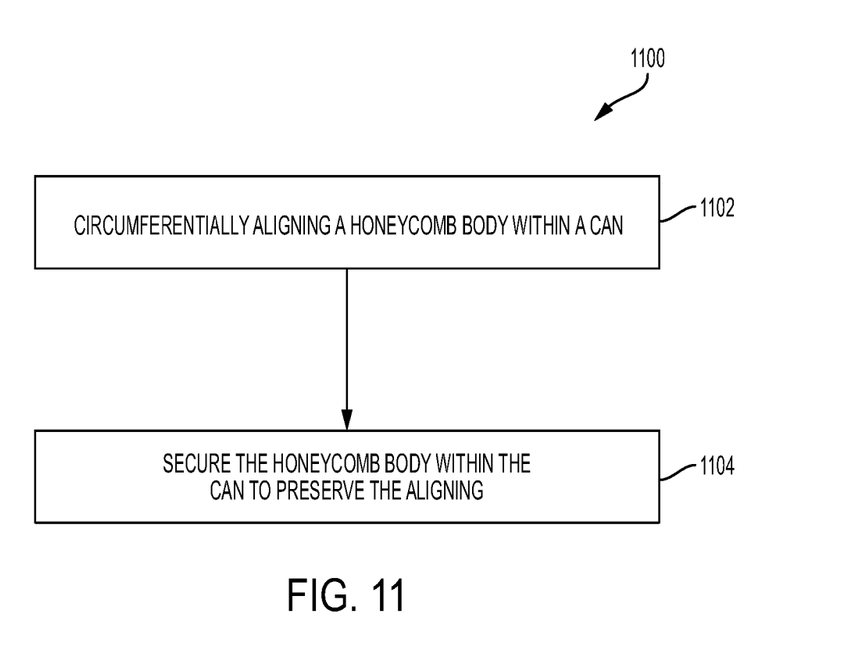
FIG. 11 shows a method of canning a honeycomb body in accordance with one embodiment of the present disclosure.

FIG. 11 shows a method 1100 of canning a honeycomb body. The method 1100 comprises positioning a honeycomb body inside a can (e.g., a catalytic converter can as shown in FIG. 3) and circumferentially aligning the honeycomb body about the longitudinal axis within the can 1102. The aligning of the honeycomb body within the can be performed by rotating the honeycomb body about its longitudinal axis. The circumferential direction is called out by reference numeral 124 in FIGS. 1 and 2. In some embodiments, the can has an asymmetric fluid flow velocity profile (e.g. produced by a curved inlet). This fluid flow velocity profile can be determined and used when circumferentially aligning the honeycomb body inside the can. The honeycomb body can be circumferentially aligned such that fluid flow through a first portion of the honeycomb body is greater than fluid flow through a second portion of the honeycomb body. In various embodiments, the first portion of the honeycomb body comprises a catalyst concentration that is greater than a catalyst concentration in the second portion of the honeycomb body. Thus, by aligning the honeycomb body in this manner, the can more efficiently uses catalyst because the portion of cells with a greater catalyst concentration corresponds to areas of high flow within the can.

In some embodiments, the honeycomb body can be a honeycomb body that comprises an off-center portion of cell with protrusions, as shown in FIGS. 2, 6B, and 9. In other embodiments, the honeycomb body comprises an off-center portion of cells with a greater cell density, as shown in FIG. 10.

The method 1100 also comprises securing the honeycomb body within the can to preserve the aligning 1104 that was performed in process 1102. In one example, the honeycomb body can be secured inside the can by pressing the honeycomb body between a base component and a cover component of the can. The base component and cover component are then fastened together. In various embodiments, an expandable ceramic mat material can be placed around the circumference of the can to help secure the honeycomb body within the can.

It will be understood that for the purposes of this disclosure, "at least one of X, Y, and Z" can be construed as X only, Y only, Z only, or any combination of two or more items X, Y, and Z (e.g., XYZ, XYY, YZ, ZZ). Furthermore, it will be understood that for the purposes of this disclosure, "X, Y, and/or Z" can be construed as X only, Y only, Z only, or any combination of two or more items X, Y, and Z (e.g., XYZ, XYY, YZ, ZZ).

Although several example embodiments have been described in detail above, those skilled in the art will readily appreciate that many modifications are possible in the example embodiments without materially departing from the scope of this disclosure. Accordingly, all such modifications are intended to be comprised within the scope of this disclosure.

What is claimed is:

1. A honeycomb body, comprising:
a porous ceramic honeycomb structure comprised of:
a network of cells defined by walls that extend in an axial direction about a longitudinal axis from an inlet end to an outlet end of the porous ceramic honeycomb structure; and
a plurality of protrusions that (i) protrude from the walls and into cells and (ii) extend from the inlet end to the outlet end of the porous ceramic honeycomb structure;
wherein the porous ceramic honeycomb structure comprises a first portion of cells comprising a first protrusion concentration, a second portion of cells comprising a second protrusion concentration, and the first protrusion concentration is greater than the second protrusion concentration; and
wherein the first portion of cells has a geometric center which is offset from the longitudinal axis as viewed in a transverse plane perpendicular to the longitudinal axis, wherein a periphery of the first portion of cells defines a shape as viewed in the transverse plane perpendicular to the longitudinal axis and the shape is asymmetric about at least one axis of the shape.

2. The honeycomb body of claim 1 wherein the first portion of cells comprises protrusions of different heights.

3. The honeycomb body of claim 1 wherein at least one cell in the first portion of cells comprises protrusion walls of different heights within the at least one cell.

4. The honeycomb body of claim 1 further comprising an outermost peripheral wall, wherein the network of cells comprises peripheral cells defined at least in part by at least a portion of the outermost peripheral wall.

5. The honeycomb body of claim 4 wherein a plurality of the peripheral cells comprise protrusions.

6. The honeycomb body of claim 1 further comprising catalyst material disposed in or on the walls of the porous ceramic honeycomb structure, wherein a greater concentration of the catalyst material is present in or on the first portion of cells as compared to a concentration of catalyst material in or on the second portion of cells.

7. The honeycomb body of claim 1 wherein the first protrusion concentration is greater than the second protrusion concentration in number of protrusions per unit area of the porous ceramic honeycomb structure, wherein the unit area of the porous ceramic honeycomb structure is viewed in the transverse plane perpendicular to the longitudinal axis.

8. The honeycomb body of claim 1 wherein the first protrusion concentration is greater than the second protrusion concentration in surface area of protrusions per unit volume of the porous ceramic honeycomb structure.

9. The honeycomb body of claim 1 wherein the second portion of cells lacks protrusions.

10. The honeycomb body of claim 1 wherein the first portion of cells comprises a contiguous collection of cells with an area of at least 20% of the porous ceramic honeycomb structure as viewed in the transverse plane perpendicular to the longitudinal axis.

11. The honeycomb body of claim 1 wherein the second portion of cells comprises a contiguous collection of cells with an area of at least 20% of the porous ceramic honeycomb structure as viewed in the transverse plane perpendicular to the longitudinal axis.

12. The honeycomb body of claim 1 wherein each protrusion of the plurality of protrusions does not extend between two different cells walls.

13. The honeycomb body of claim 1 wherein the shape defined by the periphery of the first portion of cells as viewed in the transverse plane perpendicular to the longitudinal axis is symmetric about a second axis of the shape.

14. The honeycomb body of claim 1, wherein the honeycomb body comprises at least one of (i) cordierite, (ii) aluminum titanate, or (iii) silicon carbide.

15. The honeycomb body of claim 1, wherein the walls and the plurality of protrusions comprises the same material properties.

16. A method of treating engine exhaust flow with a honeycomb body in an exhaust configuration comprising a can, an inlet pipe connected to the can, and the honeycomb body, the honeycomb body comprising a plurality of cells and a central longitudinal axis, the method comprising:
delivering the exhaust flow to the exhaust configuration, the exhaust flow having an asymmetric fluid flow velocity profile, wherein the honeycomb body is circumferentially positioned within the can such that a first portion of the cells with a first concentration of protrusions coincides with a first area of the exhaust flow and a second portion of the cells coincides with a second area of fluid flow, wherein the first portion of cells has a geometric center which is offset from the central longitudinal axis as viewed in a transverse plane perpendicular to the longitudinal axis, wherein the first area has a higher fluid flow than the second area, and wherein the second portion comprises a second concentration of protrusions or lacks protrusions, wherein a periphery of the first portion of cells defines a shape as viewed in the transverse plane perpendicular to the longitudinal axis and the shape is asymmetric about at least one axis of the shape.

17. The method of claim 16, wherein the first portion of the honeycomb body comprises a first catalyst concentration, the second portion of the honeycomb body comprises a second catalyst concentration, and the first catalyst concentration is greater than the second catalyst concentration.

18. The method of claim 17, wherein the first portion of the honeycomb body comprises a plurality of protrusions that (i) protrude from the walls and into cells and (ii) extend from an inlet end to an outlet end of the honeycomb body.

19. The method of claim 16, further comprising:
determining a fluid flow velocity profile for the can, wherein circumferentially aligning the honeycomb body within the can comprises circumferentially aligning the honeycomb body within the can using the fluid flow velocity profile.

20. The method of claim 16, wherein the inlet pipe is curved.

21. A method of installing a honeycomb body in an exhaust configuration for use with an exhaust flow having an asymmetric fluid flow velocity profile, the exhaust configuration comprising a can and an inlet pipe connected to the can, the honeycomb body comprising a plurality of cells and a central longitudinal axis, the method comprising:
circumferentially aligning the honeycomb body within the can such that a first portion of the cells with a first concentration of protrusions to coincide with a first area of the exhaust flow and a second portion of the cells to coincide with a second area of fluid flow, wherein the first portion of cells has a geometric center which is offset from the central longitudinal axis as viewed in a transverse plane perpendicular to the longitudinal axis, wherein the first area has a higher fluid flow than the second area, and wherein the second portion of cells comprises a second concentration of protrusions or lacks protrusions, wherein a periphery of the first portion of cells defines a shape as viewed in the transverse plane perpendicular to the longitudinal axis and the shape is asymmetric about at least one axis of the shape.

22. The method of claim 21 wherein the honeycomb body is circumferentially aligned with respect to the inlet pipe.

23. The method of claim 21, wherein the first portion of the honeycomb body comprises a first catalyst concentration, the second portion of the honeycomb body comprises a second catalyst concentration, and the first catalyst concentration is greater than the second catalyst concentration.

* * * * *